(No Model.)

I. BROOKE.
NUT FASTENER.

No. 298,940. Patented May 20, 1884.

WITNESSES:
A. P. Grant,
W. F. Kircher

INVENTOR:
Isaac Brooke,
BY John A. Diedersheim
ATTORNEY.

UNITED STATES PATENT OFFICE.

ISAAC BROOKE, OF POTTSTOWN, PENNSYLVANIA.

NUT-FASTENER.

SPECIFICATION forming part of Letters Patent No. 298,940, dated May 20, 1884.

Application filed January 9, 1884. (No model.)

*To all whom it may concern:*

Be it known that I, ISAAC BROOKE, a citizen of the United States, residing at Pottstown, in the county of Montgomery, State of Pennsylvania, have invented a new and useful Improvement in Nut-Fasteners, which improvement is fully set forth in the following specification and accompanying drawings, in which—

Figure 1:
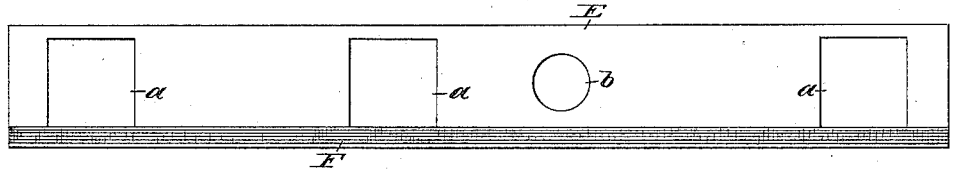
Figure 2:
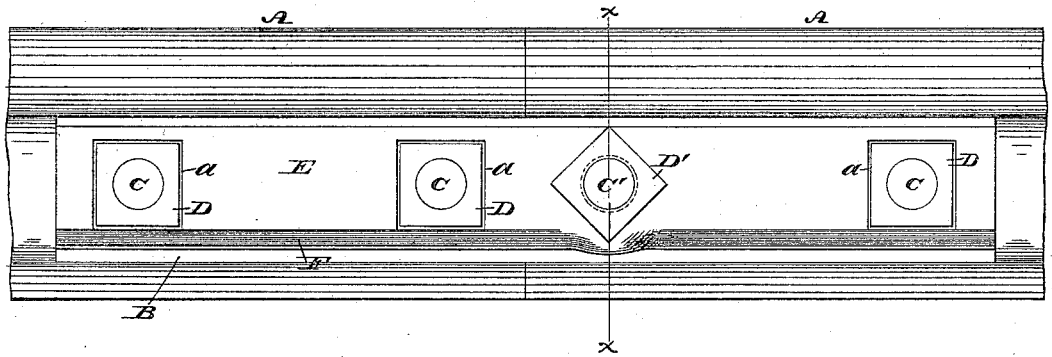
Figure 3:
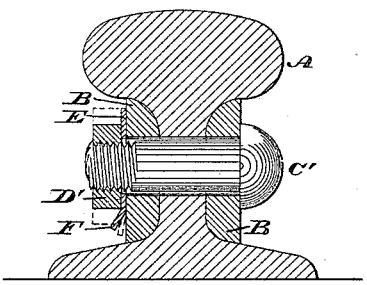

Figure 1 is a face view of a nut-fastener embodying my invention. Fig. 2 is a face view of the same in position. Fig. 3 is a transverse section in line $x\ x$, Fig. 2.

Similar letters of reference indicate corresponding parts in the several figures.

My invention consists in forming a nut-fastener of a plate which embraces the nut, and has a lip which automatically locks the nut which holds said plate in position, as will be hereinafter set forth.

Referring to the drawings, A represents rails, B fish-plates connecting the same, and C D the bolts and nuts thereof, all of which, however, are well known and form no part of the present invention.

E represents a plate which is provided with slots or openings $a$, to embrace the nuts D, and an opening, $b$, through which is passed a bolt, C′, the latter having a nut, D′, said bolt and nut serving to hold the plate E on the nuts D. The lower part of the plate E is bent outwardly, forming a lip, F, or the upper part of said plate may be similarly formed, or both the upper and lower parts may have lips, it being noticed that the plate E with its lip is constructed of sheet metal, the lip being integral with the plate.

The operation is as follows: The bolts C are fitted in position and the nuts D tightened thereon. The plate E is then located so as to embrace said nuts D, and the bolt C′ passed through the rail, or rail and fish-plate and the plate E. The nut D′ is next applied to the bolt C′ and rotated, and as its corners reach the lip F they bear against the same and cause it to yield, whereby rotation of the nut may be continued until it is fully tightened against the plate E. The lip constantly exerts its pressure against the contiguous angle or side of the nut, thus automatically locking the nut, whereby, as the nut is prevented from rotation and loosening, the plate E is securely retained on the nuts D, and the latter are prevented from unscrewing. The nuts D′ tighten directly against the plate E and are employed on the bolts C′, whereby the bolts C C′ are of the same length, and the lip is bent out only sufficiently far to be compressed by the nut D′, instead of a distance to pass under two nuts when employed, thus shortening the transverse dimensions of the lip.

Having thus described my invention, what I claim as new, and desire to secure by Letters Patent, is—

A nut-fastener consisting of a slotted plate having an elastic lip, both plate and lip being formed integral of sheet metal, the lip extending unbroken the length of the plate, and curving outwardly from the plate across the path of the sides of the nuts, whereby, when the nut is turned, the angles or corners thereof compress the lip, and the latter then exerts its holding power on said corners, and thus on the nut, substantially as and for the purpose set forth.

ISAAC BROOKE.

Witnesses:
 BROOKE GARLEY,
 WM. S. ESSICK.